United States Patent
Inoue et al.

(10) Patent No.: US 6,760,830 B2
(45) Date of Patent: Jul. 6, 2004

(54) MODULO ADDRESSING

(75) Inventors: Ryo Inoue, Austin, TX (US); Ravi Kolagotla, Austin, TX (US); Raghavan Sudhakar, Austin, TX (US)

(73) Assignees: Intel Corporation, Santa Clara, CA (US); Analog Devices Inc., Norwood, MA (US)

(*) Notice: Subject to any disclaimer, the term of this patent is extended or adjusted under 35 U.S.C. 154(b) by 203 days.

(21) Appl. No.: 09/751,507

(22) Filed: Dec. 29, 2000

(65) Prior Publication Data

US 2002/0124039 A1 Sep. 5, 2002

(51) Int. Cl.[7] .............................................. G06F 12/00
(52) U.S. Cl. ...................................... 711/220; 711/219
(58) Field of Search ................................. 711/219, 217, 711/220; 365/73, 74; 377/37, 39

(56) References Cited

U.S. PATENT DOCUMENTS

| 5,471,600 A | * | 11/1995 | Nakamoto | 711/219 |
| 5,623,621 A | * | 4/1997 | Garde | 711/217 |
| 6,073,228 A | * | 6/2000 | Holmqvist et al. | 711/217 |
| 6,378,035 B1 | * | 4/2002 | Parry et al. | 711/110 |
| 6,584,556 B1 | * | 6/2003 | Witt | 711/217 |

FOREIGN PATENT DOCUMENTS

| EP | 0493834 | 7/1992 |
| EP | 0676691 | 10/1995 |

* cited by examiner

*Primary Examiner*—Matthew Kim
*Assistant Examiner*—Woo H. Choi
(74) *Attorney, Agent, or Firm*—Fish & Richardson P.C.

(57) ABSTRACT

In one embodiment, a modulo addressing unit for a processor is described that includes a plurality of adders to generate an uncorrected target module address and at least one corrected target module address in parallel. A comparator selects one of the target module addresses a function of a base address (b) for a circular buffer, a length (L) of the circular buffer, an index address (I) and a modifier value (M). In one embodiment the comparator selects a first corrected target module address when I+M<B, a second corrected target module address when I+M>=B+L and an uncorrected module address when B<=I+M<B+L.

20 Claims, 3 Drawing Sheets

MODULO ADDRESSING

BACKGROUND

Digital signal processors (DSP) often include specialized hardware for supporting digital signal processing functions, such as the fast fourier transform (FFT). For example, many DSP's include modulo addressing registers and other hardware support for accessing data structures, such as circular buffers, necessary for manipulating and processing data.

DETAILED DESCRIPTION

Figure 1:
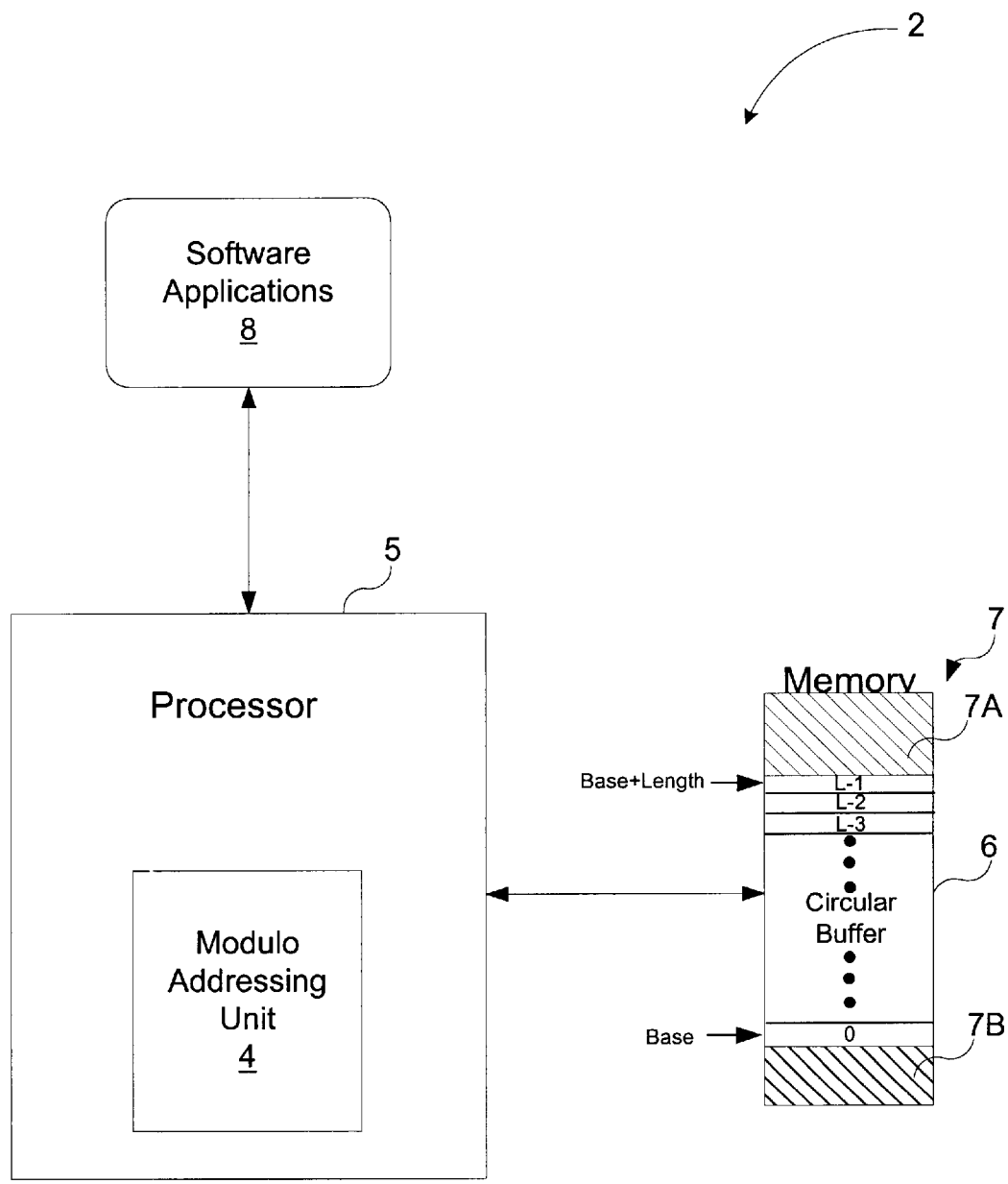
FIG. 1 is a block diagram illustrating an example of a programmable processor adapted to support modulo addressing according to the invention.

FIG. 1 is a block diagram of an example system 2 having a processor 5 coupled of a memory device 7. Processor 5 includes modulo addressing unit 4 that, as described below, comprises specialized hardware to support efficient modulo address calculations. Software applications 8 comprise machine instructions that, when executed by processor 5, create and maintain data structures for processing data, such as circular buffer 6. Memory 7 stores circular buffer 6, typically in linear fashion over a range of memory addresses from a starting memory address to an ending memory address. Memory device 7 may comprise different memory technologies, such as FLASH memory, static random access memory (SRAM) or dynamic random access memory (DRAM).

In response to the machine instructions issued by software applications 8, modulo addressing unit 4 calculates the appropriate memory addresses necessary to interact with circular buffer 6 in order to store and retrieve data. The memory address range of circular buffer 6 can be defined in a number of ways. For example, as used for exemplary purposes below, the memory address range can be defined in terms of a base address (B) and a length (L). Alternatively, the range may be defined in terms of a base address (b) and an ending address.

While software applications 8 are accessing circular buffer 6, modulo addressing unit 4 is responsible for calculating the correct memory address of the data. In addition, module addressing unit 4 includes detection logic to determine whether an address falls outside the memory address range of circular buffer 6. In such circumstances, as described below, modulo addressing unit 4 "wraps" the memory address to a corresponding memory address within the address range of circular buffer 6.

One technique used in conventional systems to wrap an address into circular buffer 6, is to detect an out of range condition upon incrementing the target address past the end of the circular buffer 6 such that the target address falls within memory region 7A. At this time, the target address can be wrapped back into an acceptable address by subtracting the length of the buffer from the target address. Similarly, when the modifier (M) is a negative number, such that the circular buffer 6 is traversed from the ending address toward the starting address, an out-of-range condition is detected when the target address falls below the starting address of the circular buffer within memory region 7A. In this situation, the target address can be wrapped back into the circular buffer by adding the length of the circular buffer to the target address. Many of the conventional techniques examine the sign of the modifier to determine the direction in which the circular buffer 6 is being traversed before calculating a corrected target address. As described below, modulo addressing unit 4 supports range checking and address generation independent from the direction in which circular buffer is being traversed.

Figure 2:
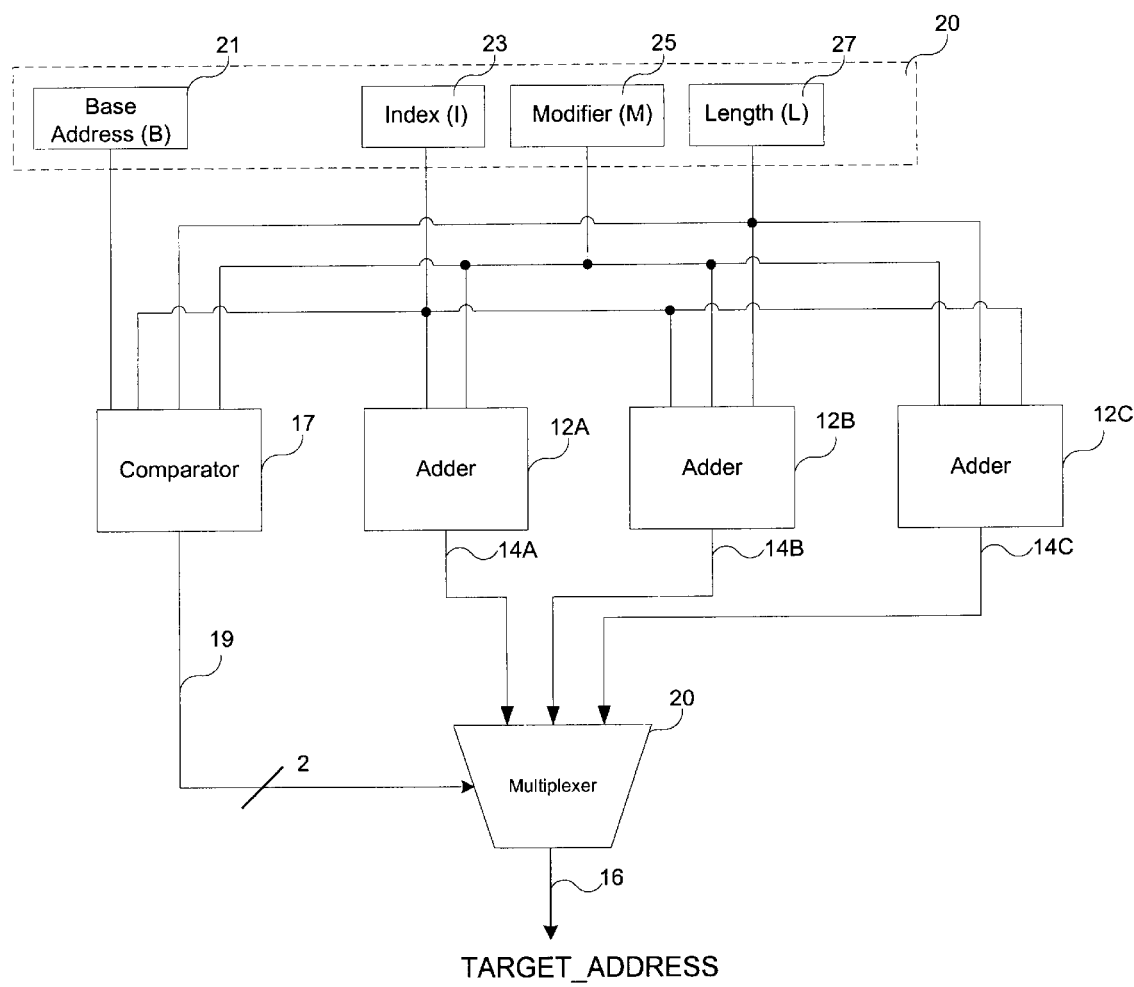
FIG. 2 is a block diagram illustrating an example modulo addressing unit of the programmable processor.

FIG. 2 is a block diagram illustrating one embodiment of modulo addressing unit 4 that may calculate a final target memory address 16 for each access of circular buffer 6 within memory device 7. Modulo addressing unit 4 may includes a number of modulo registers 20 such as a base address register 21 and a length register 27 for storing the base address and length of circular buffer 6, respectively. In addition, modulo addressing unit 4 may include index register 23 for storing an index address (I), which points to a current location within circular buffer 6. Modifier register 25 may store a modifier value (M) used as to increment or decrement the index address I for each access of circular buffer 6. For example, after accessing a first data value at memory address I within circular buffer 6, the next data value accessed may typically be address I+M, where M can either be a positive or negative integer.

In order to ensure that the target address falls within the memory address range of circular buffer 6 without testing the sign of the modifier (M), modulo addressing unit 4 includes three adders, 12A, 12B and 12C that calculate three possible target addresses in parallel. Adder 12A receives the index value (I) and the modifier value (M) and outputs a first target address 14A equal to I+M. Adder 12B receives the index value (I), the modifier value (M) and the length of the buffer (L) and outputs a second target address 14B equal to I+M+L. Adder 12C receives I, M and L and outputs a third possible target address 14C equal to I+M−L. In this manner, target addresses 14A, 14B and 14C represent: (1) an uncorrected target address, (2) a corrected target address for use when the uncorrected target address falls below the acceptable address range, and (3) a corrected target address for use when the uncorrected target address falls above the acceptable address range, respectively.

In parallel to the computation of the possible target addresses 14, comparator 17 receives the index address (I), the modifier value (M), the buffer length (L) and the base address (B). Based on the inputs, asserts selection signals 19 to cause multiplexer 20 to select one of the three possible target address 14A, 14B and 14C as the final target address 16. More specifically, comparator 17 is adapted to assert selection signals 19 to select an appropriate target address 14 in based on whether the target address falls outside of the acceptable range of addresses and, therefore, must be corrected. Notably, comparator 17 need not determine the sign of the modifier in selecting an appropriate target address 14. Because modulo addressing unit 4 includes a plurality of adders 12 that calculate an uncorrected target address and two corrected target addresses, comparator 17 need not determine the direction in which circular buffer 6 is being traversed. In this manner, comparator may select the appropriate target address 14 independently from the sign of the modifier. In one embodiment, selection signals 19 comprise two signals defining four states for selecting one of the three possible target addresses 14 provided by adders 12, as illustrated in the following table:

TABLE 1

| Selection Signals | Condition | Destination Address |
|---|---|---|
| 00 | B <= I + M < B + L | I + M (14A) |
| 01 | I + M < B | I + M + L (14B) |
| 10 | I + M >= B + L | I + M − L (14C) |
| 11 | — | — |

Figure 3:
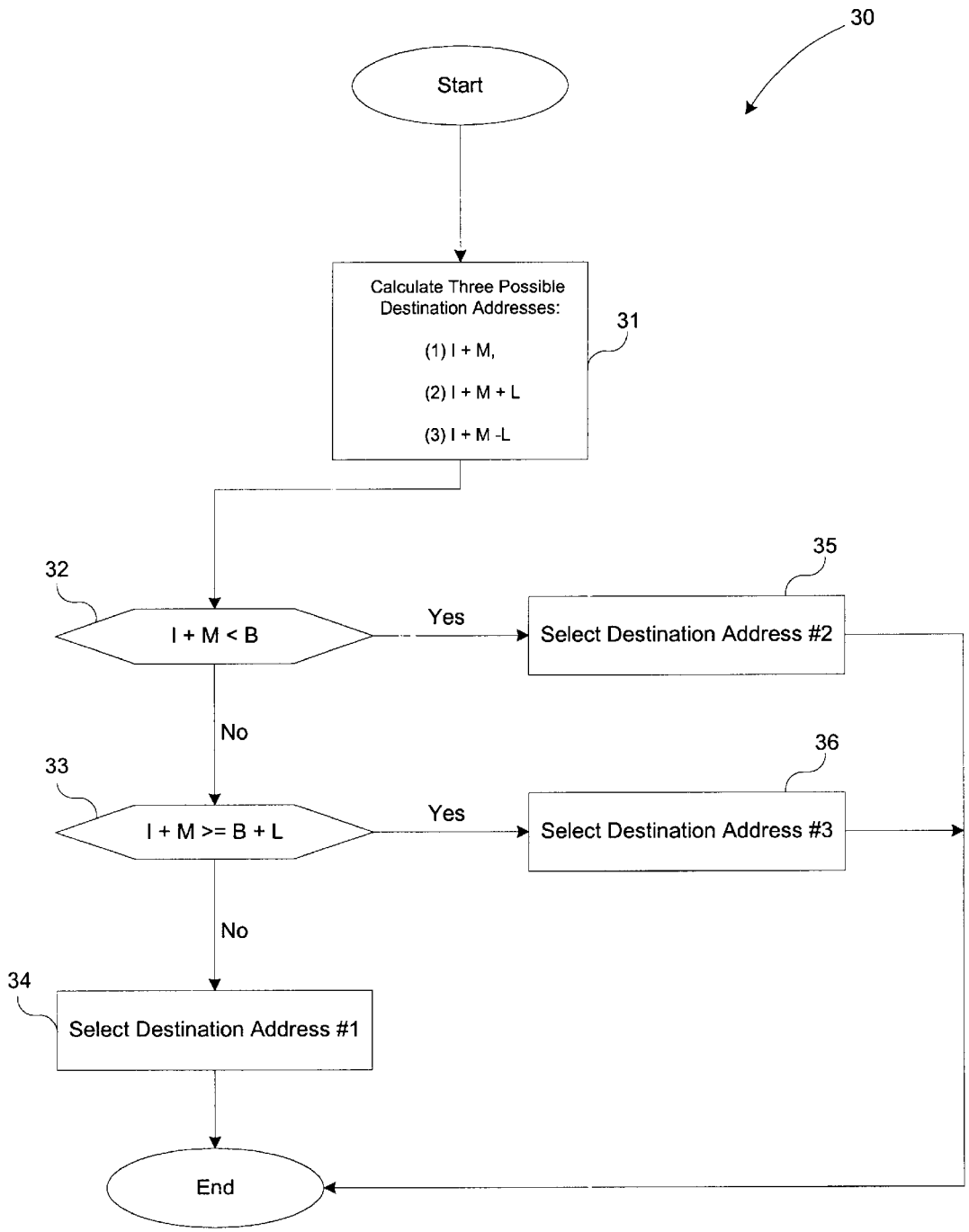
FIG. 3 is an example mode of operation of the modulo addressing unit.

FIG. 3 is a flowchart illustrating an example mode of operation 30 of modulo addressing unit 4 for calculating and selecting a target address within circular buffer 6 independently from the direction in which the circular buffer 6 is being traversed. Although illustrated sequentially, many of the operations may occur in parallel, as described above.

First, modulo addressing unit 4 of processor 5 calculates three possible target addresses: (1) I+M, (2) I+M+L and (3) I+M−L (31). As described above, the second and third possible target addresses are calculated to wrap the target address back into an circular buffer 6 in the event the target address is below the starting address or above the ending address, respectively.

In parallel with the address calculation, modulo addressing unit 4 determines whether the target address falls outside the acceptable address range and, therefore, needs correction. More specifically, modulo addressing unit 4 determines whether I+M is <B, i.e. whether the target address falls below the address range of circular buffer 6 (32). If so, multiplexer 10 selects target address #2 as provided by adder 12B (35). If not, modulo addressing unit 4 determines whether the target address falls beyond the upper end of circular buffer 6 (33) and, if so, selects target address #3 as provided by adder 12C (36). If not, modulo addressing unit 4 selects the target address #1 as supplied by adder 12A, which falls within the acceptable address range of circular buffer 6 and may not be corrected (34).

Various embodiments of the invention have been described. The processor described above may be implemented in a variety of systems including general purpose computing systems, digital processing systems, laptop computers, personal digital assistants (PDA's) and cellular phones. In such a system, the processor may be coupled to a memory device, such as a Flash memory device or a static random access memory (SRAM), that stores an operating system and other software applications. These and other embodiments are within the scope of the following claims.

What is claimed is:

1. An apparatus comprising:
a plurality of adders electrically connected in a parallel structure and adapted to concurrently output an uncorrected target modulo address as a function of an index address and a modifier value and at least two corrected target modulo address as a function of the index address, the modifier value and a length value; and
a comparator to select one of the target modulo addresses independent from a sign of the modifier value.

2. The apparatus of claim 1, wherein the plurality of adders comprise:
a first adder adapted to output a first target modulo address equal to the index address plus the modifier value;
a second adder adapted to output a second target modulo address equal to the index address plus the modifier value plus a length value; and
a third adder adapted to output a third target modulo address equal to the index address plus the modifier value minus a length value.

3. The apparatus of claim 2, further comprising:
an index register to store the index address;
a modifier register to store the modifier value; and
a length register to store the length value.

4. The apparatus of claim 1, further comprising a multiplexer to select one of the target modulo addresses.

5. The apparatus of claim 4, further comprising a comparator adapted to output a plurality of selection signals to control the multiplexer.

6. The apparatus of claim 5, wherein the comparator asserts the selection signals as a function of a base address (b) for a circular buffer, a length (L) of the circular buffer, an index address (I) and a modifier value (M).

7. The apparatus of claim 6, wherein the comparator asserts the selection signals to a first stat e when I+M<B, a second state when I+M>=B+L and a third state when B<=I+M<B+L.

8. A method comprising:
concurrently generating an uncorrected target modulo address as a function of an index address and a modifier value and at least two corrected target module addresses in parallel as a function of the index address, the modifier value and a length value; wherein the concurrent generation occurs in a structure electrically connected in parallel; and
selecting one of the target module addresses independently from a sign of the modifier value.

9. The method of claim 8, wherein generating the target module addresses comprises:
generating first a target module address equal to the index address plus the modifier value;
generating a second target module address equal to the index address plus the modifier value plus the length value; and
generating a third target modulo address equal to the index address plus the modifier value minus the length value.

10. The method of claim 9 further comprising:
storing the index address, the modifier value and the length value in module registers.

11. The method of claim 8, wherein selecting one of the target modulo addresses comprises selecting the target modulo address as a function of a base address (b) for a circular buffer, a length (L) of the circular buffer, an index address (I) and a modifier value (M).

12. The method of claim 11, wherein selecting one of the target modulo addresses comprises:
selecting a first target modulo address when I+M<B;
selecting a second target modulo address when I+M>= B+L; and
selecting a third target modulo address when B<=I+M<B+L.

13. A system comprising:
a Flash memory device; and
a processor including an modulo addressing unit comprising:
a plurality of adders in an electrically connected parallel structure adapted to concurrently output an uncorrected target modulo address as a function of an index address and a modifier value and at least two corrected target modulo addresses as a function of the index address, the modifier value and a length value; and
a comparator to select one of the target modulo addresses independent from a sign of the modifier value.

14. The system of claim 13, wherein the modulo addressing unit comprises a comparator to select one of the target modulo addresses.

15. The system of claim 13, wherein the plurality of adders comprise:

a first adder adapted to output a first target modulo address equal to the index address plus the modifier value;

a second adder adapted to output a second target modulo address equal to the index address plus the modifier value plus the length value; and a second adder adapted to output a third target modulo address equal to the index address plus the modifier value plus the length value; and a third adder adapted to output a third target modulo address equal to the index address plus modifier value minus the length value.

16. The system of claim 15, the modulo addressing unit further comprises:

an index register to store the index address;

a modifier register to store the modifier value; and a length register to store the length value.

17. The system of claim 13, wherein the modulo addressing unit further comprises a multiplexer to select one of the target modulo addresses.

18. The system of claim 17, wherein the modulo addressing unit further comprises a comparator adapted to output a plurality of selection signals to control the multiplexer.

19. The system of claim 18, wherein the comparator asserts the selection signals as a function of a base address (b) for a circular buffer, a length (L) of the circular buffer, an index address (I) and a modifier value (M).

20. The system of claim 19, wherein the comparator asserts the selection signals in a first state when I+M<B, a second state when I+M>=B+L and a third state when B<=I+M<B+L.

* * * * *

UNITED STATES PATENT AND TRADEMARK OFFICE
CERTIFICATE OF CORRECTION

PATENT NO.    : 6,760,830 B2
DATED         : July 6, 2004
INVENTOR(S)   : Raghavan Sudhakar, Ryo Inoue and Ravi K. Kolagotla It is certified that error appears in the above-identified patent and that said Letters Patent is hereby corrected as shown below:

Column 3,
Line 54, please replace "address" with -- addresses --.
Line 54, after "length value", please add -- , wherein each of said plurality of adders calculates an address independently of the output of the other said adders --.

Column 7,
Line 15, please replace "stat e" with -- state --.
Line 21, please replace "module" with -- modulo --.
Line 23, after "length value", please delete ";" and replace it with -- , --.
Line 23, please replace "occurs in a structure electrically connected in parallel; and" with -- of the address occurs independently of the output of the other side parallel address generation; and --.

Signed and Sealed this

Twenty-sixth Day of July, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,760,830 B2 |
| DATED | : July 6, 2004 |
| INVENTOR(S) | : Raghavan Sudhakar, Ryo Inoue and Ravi K. Kolagotla |

It is certified that error appears in the above-identified patent and that said Letters Patent is hereby corrected as shown below:

Title page,
Item [57], ABSTRACT,
Lines 3, 4, 5, 9, 10 and 11, replace all "module" with -- modulo --.

Column 1,
Line 51, replace "module" with -- modulo --.

Column 3,
Line 54, please replace "address" with -- addresses --.
Line 54, after "length value", please add -- , wherein each of said plurality of adders calculates an address independently of the output of the other said adders --.

Column 4,
Line 15, please replace "stat e" with -- state --.
Line 21, please replace "module" with -- modulo --.
Line 23, after "length value", please delete ";" and replace it with -- , --.
Line 23, please replace "occurs in a structure electrically connected in parallel; and" with -- of the address occurs independently of the output of the other side parallel address generation; and --.
Lines 26, 29, 30, 32 and 41, replace "module" with -- modulo --.
Line 64, replace "; and" with -- , wherein each of said plurality of adders calculates an address independently of the output of the other said adders; --.

Column 5,
Line 12, replace "second" with -- third --.
Line 13, delete "modifier value plus the length value; and".

UNITED STATES PATENT AND TRADEMARK OFFICE
CERTIFICATE OF CORRECTION

PATENT NO. : 6,760,830 B2
DATED : July 6, 2004
INVENTOR(S) : Raghavan Sudhakar, Ryo Inoue and Ravi K. Kolagotla It is certified that error appears in the above-identified patent and that said Letters Patent is hereby corrected as shown below:

<u>Column 5 (cont'd),</u>
Line 15, delete "a third adder adapted to output a third target modulo address equal to the index address plus".

This Certificate supersedes Certificate of Correction issued July 26, 2005.

Signed and Sealed this

Twenty-eighth Day of March, 2006

JON W. DUDAS
*Director of the United States Patent and Trademark Office*